US008409063B2

(12) United States Patent
Ebert et al.

(10) Patent No.: US 8,409,063 B2
(45) Date of Patent: Apr. 2, 2013

(54) NIP ROLLERS WITH REMOVABLE DISKS

(75) Inventors: Dieter Theodor Ebert, Stratham, NH (US); Joseph Adrian St. Ours, Lee, NH (US)

(73) Assignee: Goss International Americas, Inc., Durham, NH (US)

( * ) Notice: Subject to any disclaimer, the term of this patent is extended or adjusted under 35 U.S.C. 154(b) by 779 days.

(21) Appl. No.: 12/462,900

(22) Filed: Aug. 11, 2009

(65) Prior Publication Data

US 2011/0036254 A1 Feb. 17, 2011

(51) Int. Cl.
*F16C 13/00* (2006.01)
*B65H 20/00* (2006.01)

(52) U.S. Cl. ................ 492/39; 492/40; 492/20; 492/38; 226/190; 226/185; 226/189

(58) Field of Classification Search .................... 492/39, 492/40, 20, 38; 226/181, 182, 185, 189, 226/190
See application file for complete search history.

(56) References Cited

U.S. PATENT DOCUMENTS

| | | | | |
|---|---|---|---|---|
| 4,241,882 | A * | 12/1980 | Baikoff | 241/236 |
| 4,457,058 | A * | 7/1984 | Binder et al. | 19/1 |
| 4,524,962 | A | 6/1985 | Davenport et al. | 270/21.1 |
| 4,872,247 | A * | 10/1989 | Nakamura et al. | 492/40 |
| 5,045,045 | A * | 9/1991 | Davenport et al. | 493/363 |
| 5,647,277 | A * | 7/1997 | DeVito | 101/226 |
| 5,727,724 | A * | 3/1998 | Dowling | 226/181 |
| 6,142,923 | A * | 11/2000 | Bakoledis | 493/243 |
| 6,615,724 | B2 * | 9/2003 | Rombult et al. | 101/477 |
| 2005/0204940 | A1 | 9/2005 | Elliott et al. | |
| 2010/0022376 | A1 | 1/2010 | Ackermann et al. | |

FOREIGN PATENT DOCUMENTS

EP 2 149 530 A1 2/2010

* cited by examiner

*Primary Examiner* — Essama Omgba
(74) *Attorney, Agent, or Firm* — Davidson, Davidson & Kappel, LLC

(57) ABSTRACT

A nip roller is provided that includes a shaft, a first nip disk portion, a second nip disk portion and an attachment section for removably securing the first nip disk portion and the second nip disk portion to the shaft.

12 Claims, 6 Drawing Sheets

NIP ROLLERS WITH REMOVABLE DISKS

The present invention relates generally to nip rollers for transporting substrates in printing presses and more particularly to a nip roller having removable nip disks.

BACKGROUND OF INVENTION

Nip rollers are sometimes used in printing presses to guide substrates, such as webs or signatures, along a predetermined path. A pair of nip rollers may contact one another to form a nip, through which the substrate passes.

Nip rollers may include a clamp collar style nip, a segmented nip affixed to a hose clamp and an elastic nip donut. Some designs may cause the nip rollers to have a relatively high moment of inertia. Other designs may not allow for 360 degrees of nip contact surface. Additionally, changing parts of nip rollers may be time consuming for some designs.

BRIEF SUMMARY OF THE INVENTION

A nip roller is provided that includes a shaft, a first nip disk portion, a second nip disk portion and an attachment section for removably securing the first nip disk portion and the second nip disk portion to the shaft.

BRIEF DESCRIPTION OF THE DRAWINGS

The present invention is described below by reference to the following drawings, in which.

DETAILED DESCRIPTION

Figure 1A:
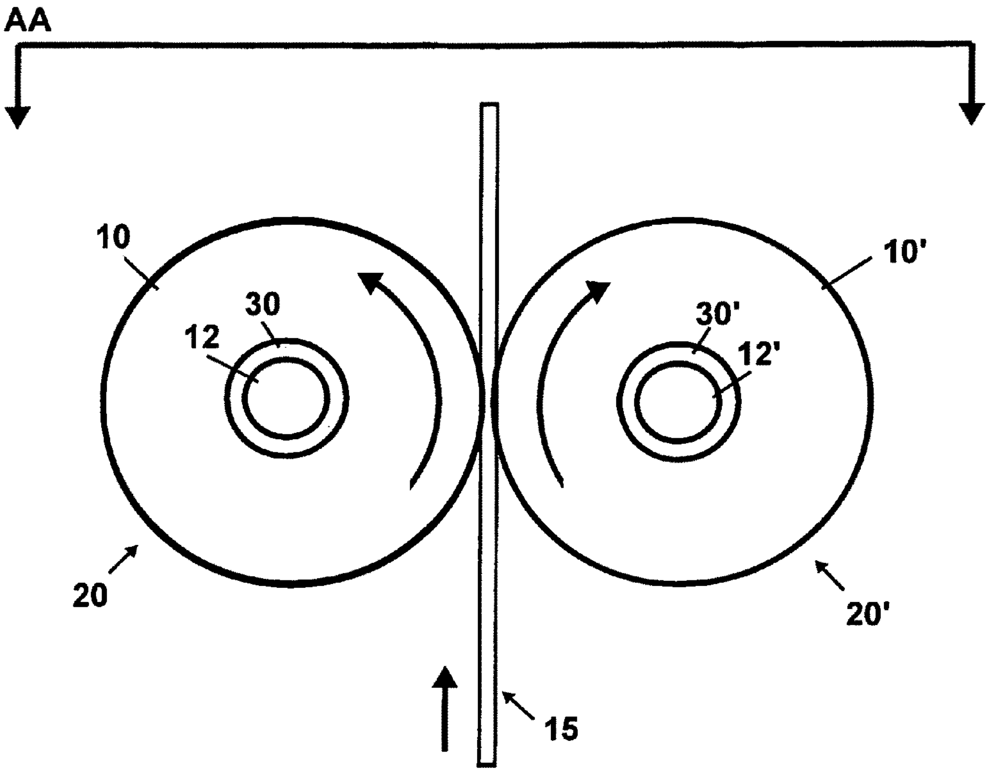
FIG. 1A shows a schematic axial view of a pair of nip rollers guiding a printed signature according to an embodiment of the present invention.

FIG. 1A shows a schematic axial view of a pair of nip rollers 20, 20' according to an embodiment of the present invention guiding a printed signature 15. Nip rollers 20, 20' are identical and each nip roller 20, 20' includes a plurality of respective disks 10, 10' that are mounted via respective attachment rings 30, 30' on shafts 12, 12'. Shafts 12, 12' may rotate in associated bearings to allow nip rollers 20, 20' to guide and transport signature 15. Nip rollers 20, 20' may also be used to guide a web or ribbons in a printing press.

Figure 1B:
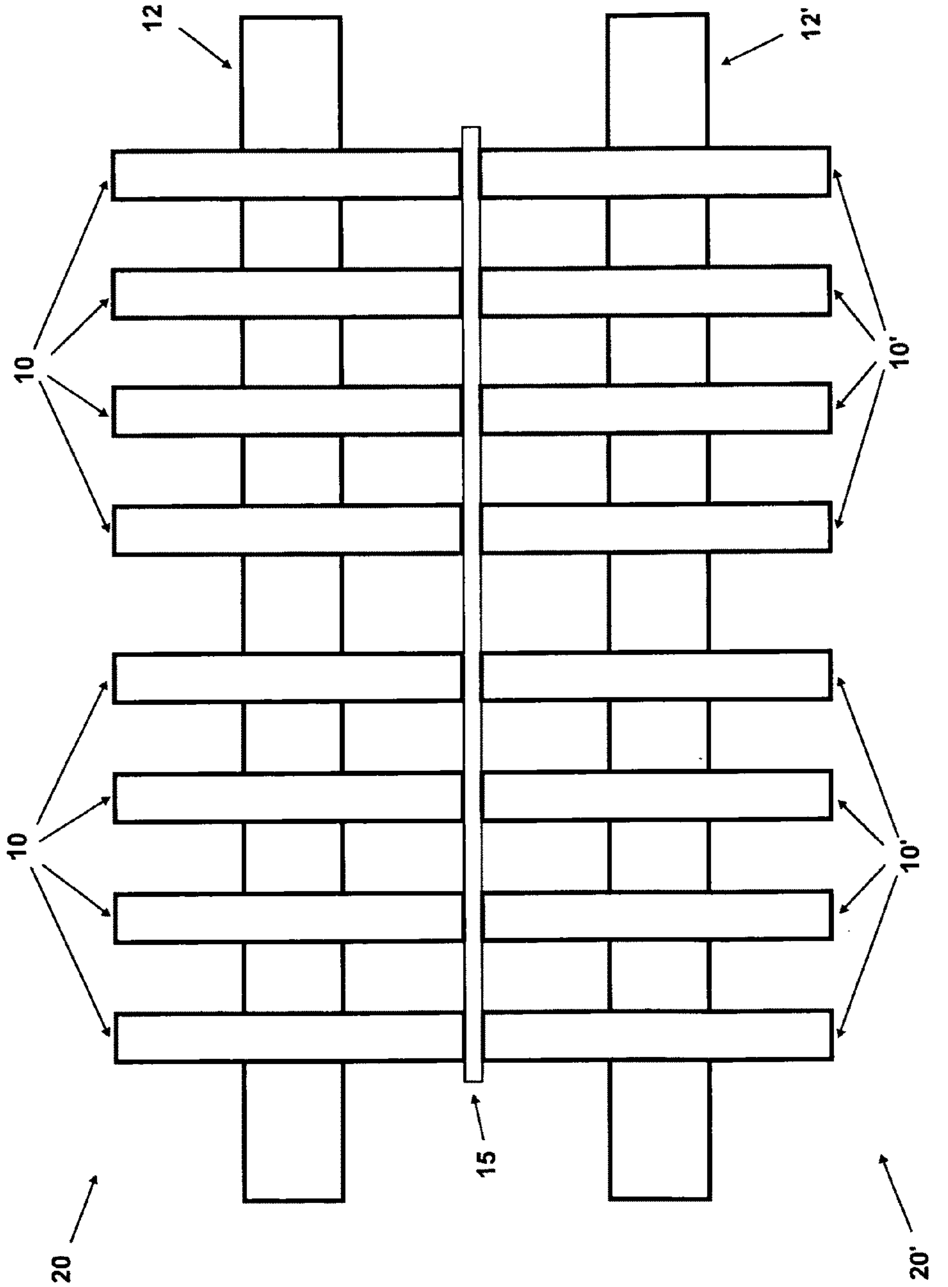
FIG. 1B shows a schematic view of the pair of nip rollers along plane AA of FIG. 1A.

FIG. 1B shows a schematic view of nip rollers 20, 20' along plane AA of FIG. 1A. In this example, eight nip disks 10, 10' are installed on each respective shaft 12, 12'; however, the number of nip disks 10, 10' used is not limited to any particular amount and may be varied.

Figure 2:
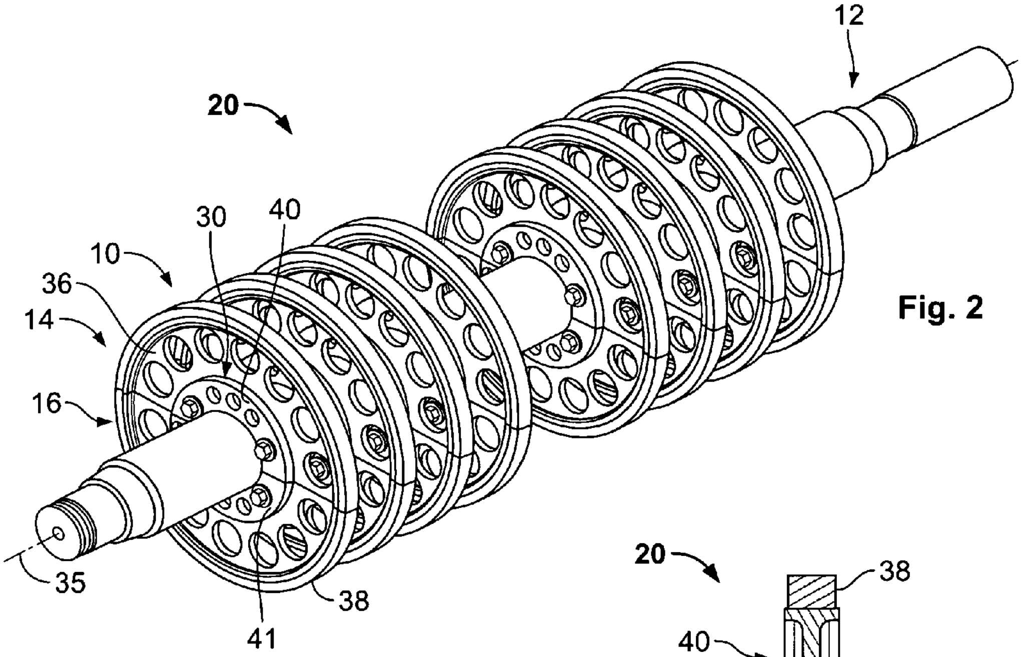
FIG. 2 shows a perspective view of one of the nip rollers shown in FIGS. 1A and 1B.

FIG. 2 shows a perspective view of nip roller 20. In a preferred embodiment, nip roller 20' (FIGS. 1A, 1B) is identical to nip roller 20. Each nip disk 10 may include two separate semi-annular disk halves 14, 16 that form nip disk 10 when mounted on shaft 12. Disk halves 14, 16 are secured to shaft 12 by attachment ring 30, which in this embodiment preferably includes two semi-annular ring halves 40, 41, one for each disk half 14, 16. Attachment ring 30 is divided into two separates halves 40, 41, so that each disk half 14, 16 may be separately removed from shaft 12. Ring half 40 secures disk half 14 to shaft 12 and ring half 41 secures disk half 16 to shaft 12. Each disk half 14, 16 includes a base disk portion 36, which in a preferred embodiment is made of a strong lightweight material, and a nip material 38 attached to an outer circumference of each base portion 36. When disk halves 14, 16 are mounted on shaft 12, base portions 36 surround a circumference of shaft 12 and nip material 38 surrounds base disk portions 36, forming an outer circumferential portion of disk 10. Nip material 38 is preferably elastic and allows nip roller 20 to have sufficient control over substrates that nip roller 20 acts upon. During operation, shaft 12 rotates about an axis 35.

Figure 3:
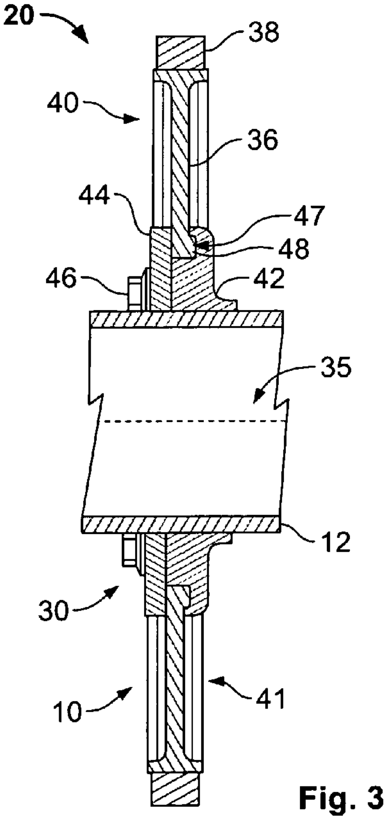
FIG. 3 shows a view of a radial cross section of a portion of the nip roller shown in FIGS. 1A to 2.

FIG. 3 shows a view of a radial cross section of a portion of nip roller 20. Base disk portions 36 are coupled to shaft 12 via attachment ring 30. Each attachment half 40, 41 includes a mandrel 42, a keeper 44 and one or more fasteners 46. For each attachment half 40, 41, either mandrel 42 or keeper 44 may be secured to shaft 12, with the other of mandrel 42 and keeper 44 being axially slidable on shaft 12. Disk halves 14, 16 each include a radial aligning section 48 that protrudes axially with respect to axis 35 away from base disk portion 36 near the respective inner circumference of the respective disk half 14, 16. In a preferred embodiment, each radial aligning section 48 extends along the entire inner circumference of the respective base disk portion 36. In alternative embodiments, each radial aligning section 48 may extend only along a portion of the inner circumference of the respective base disk portion 36.

In this embodiment, mandrels 42 and keepers 44 are semi-annularly shaped and each have an inner circumference that substantially corresponds to an outer circumference of shaft 12. Mandrels 42 each include a groove 47 that extends axially into the respective mandrel 42 and is shaped to accept the corresponding radial aligning section 48. Each fastener 46 passes through a corresponding hole, which may be threaded or unthreaded, in the respective keeper 44 and a threaded end of each fastener 46 enters into a threaded hole in the respective mandrel 42. Fasteners 46 may be screwed into mandrels 42 to cause keepers 44 and mandrels 42 to secure nip disk 10 to shaft 12. In a preferred embodiment, a plurality of fasteners 46 may be spaced about shaft 12 passing through holes in respective keepers 44 and mandrels 42. In order to replace disk halves 14, 16 after damage or wear, fasteners 46 may be loosened to move axially a sufficient distance such that the radial aligning section 48 of each disk half 14, 16 may be manually disengaged from the respective groove 47 by an operator.

In one alternative embodiment, attachment ring 30 may not be divided into two separate halves and may include only a single annular mandrel and a single annular keeper. In other alternative embodiments, disk halves 14, 16 may be secured to shaft 12 via attachment ring 30 in a different manner. For example, disk halves 14, 16 may include threaded or unthreaded holes and disk halves 14, 16 may be secured to shaft 12 by passing fasteners 46 through holes in at least one keeper 44, holes in disk halves 14, 16 and holes in at least one mandrel 42. Also, only one of the at least one keeper 44 or the at least one mandrel 42 may be used with fasteners 46 passing through holes in disk halves 14, 16 to secure disk halves 14, 16 to shaft 12. Furthermore, disk halves 14, 16 are not restricted to being precisely one-half of a disk, and may be any combination which, when mounted together, forms a complete disk and which each fit over the shaft.

Figure 4:
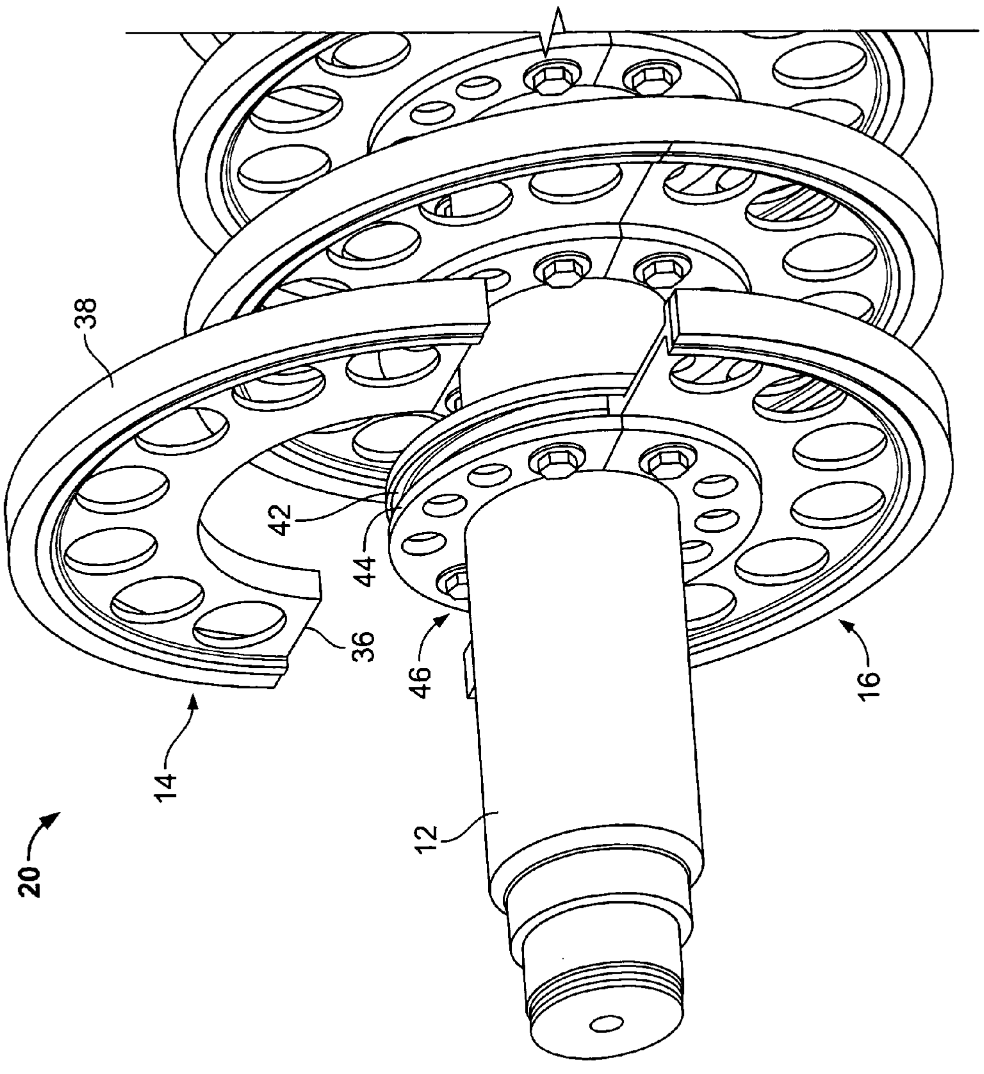
FIG. 4 shows a perspective view of the nip roller shown in FIGS. 2 and 3 with a disk half released and pulled radially away from a shaft of the nip roller.

FIG. 4 shows a perspective view of nip roller 20 shown in FIG. 2 with disk half 14 released and pulled radially away from shaft 12. Disk half 14 was released by unscrewing fasteners 46 of attachment half 40. Fasteners 46 may only have to be unscrewed a couple of millimeters to allow enough separation between mandrel 42 and keeper 44 of attachment half 40 for radial aligning section 48 to be released from groove 47. In a preferred embodiment, fasteners 46 maintain contact with the respective mandrel 42 and keeper 44 when fasteners 46 are unscrewed and disk halves 14, 16 are detached from shaft 12. This may allow disk halves 14, 16 to be replaced or repaired without a maintenance person having to keep track of the parts of attachment halves 40, 41.

Figure 5:
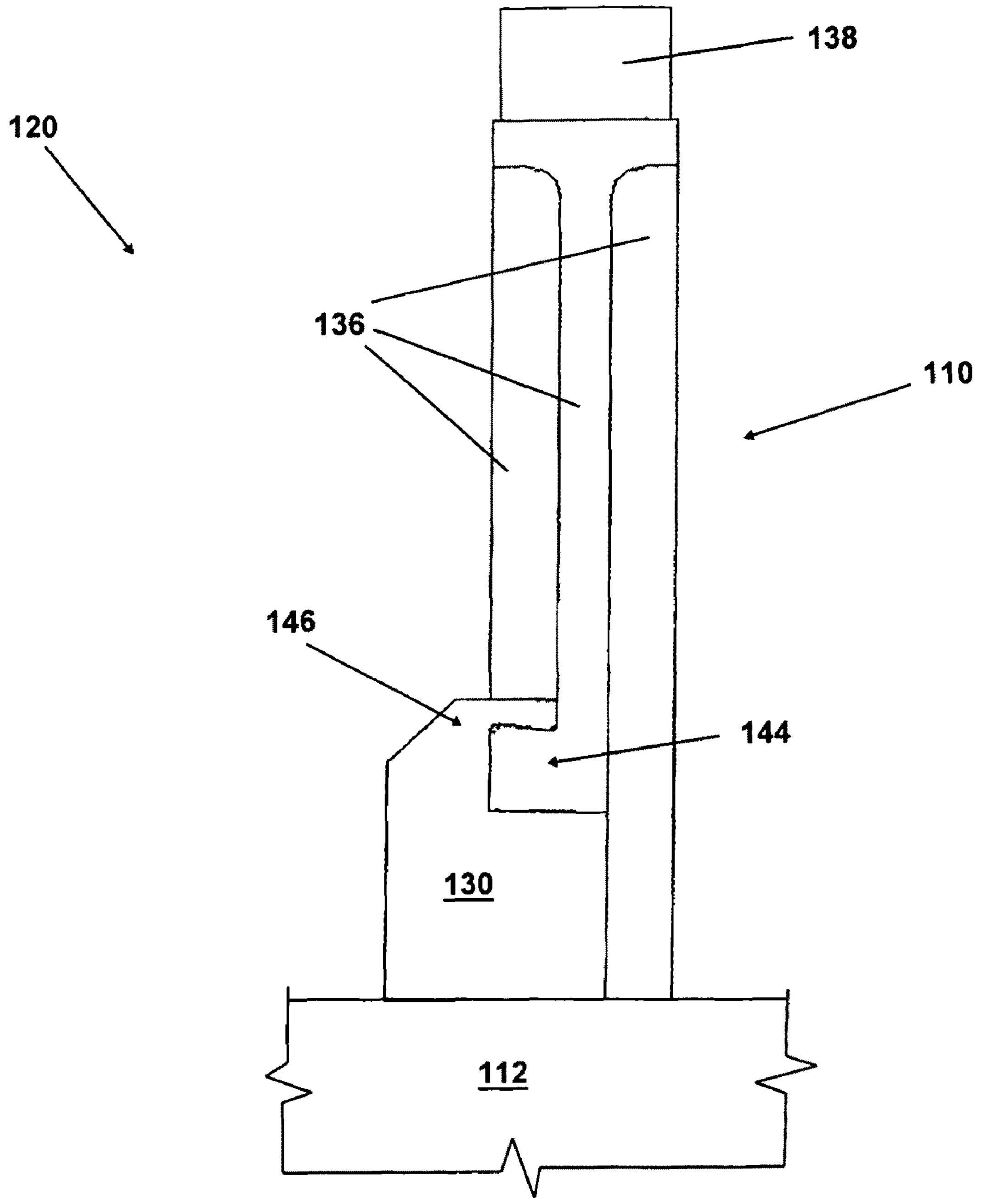
FIG. 5 shows a radial cross section of a nip roller according to a second embodiment of the present invention.

FIG. 5 shows a radial cross section of a nip roller 120 according to another embodiment of the present invention. Nip roller 120 includes an attachment ring 130 attached to an outer circumference of a shaft 112. A nip disk 110 is removably attachable to shaft 112 via attachment ring 130 by a male attachment section 144 which extends axially from nip disk 110 with respect to an axis of shaft 112, into a corresponding female section 146 of attachment ring 130. Nip disk 110 includes a base disk portion 136, which in a preferred embodiment is made of a strong lightweight material, and a nip material 138 attached to an outer circumference of each base portion 136. In a preferred embodiment, nip disk 110 includes two semi-annular disk halves, each disk half including a male attachment section 144 removably attachable to shaft 112 via a corresponding female section 146 of attachment ring 130. Nip disk 110 may be easily removed from shaft 112 by manually pulling each disk half away from attachment ring 130 with sufficient force to unsnap each male attachment section 144 from the corresponding female section 146. The disk halves may then be repaired or replaced by new disk halves. The new or repaired disk halves then can be easily securely attached to shaft 112 via manual pressing, i.e., snapping the disk halves into attachment ring 130. Nip roller 120 may include a plurality of nip disks 110 attached to shaft 112 and may be used with another nip roller to guide signatures or a web in a printing press. In an alternative embodiment, which would still allow the disk halves of nip disk 110 to be attached to attachment ring 130 via manually pressing, the disk halves may each include at least one female attachment section instead of or in addition to male attachment sections 144 and the attachment ring 130 may include at least one male attachment section instead of or in addition to female attachment sections 146.

Figure 6:
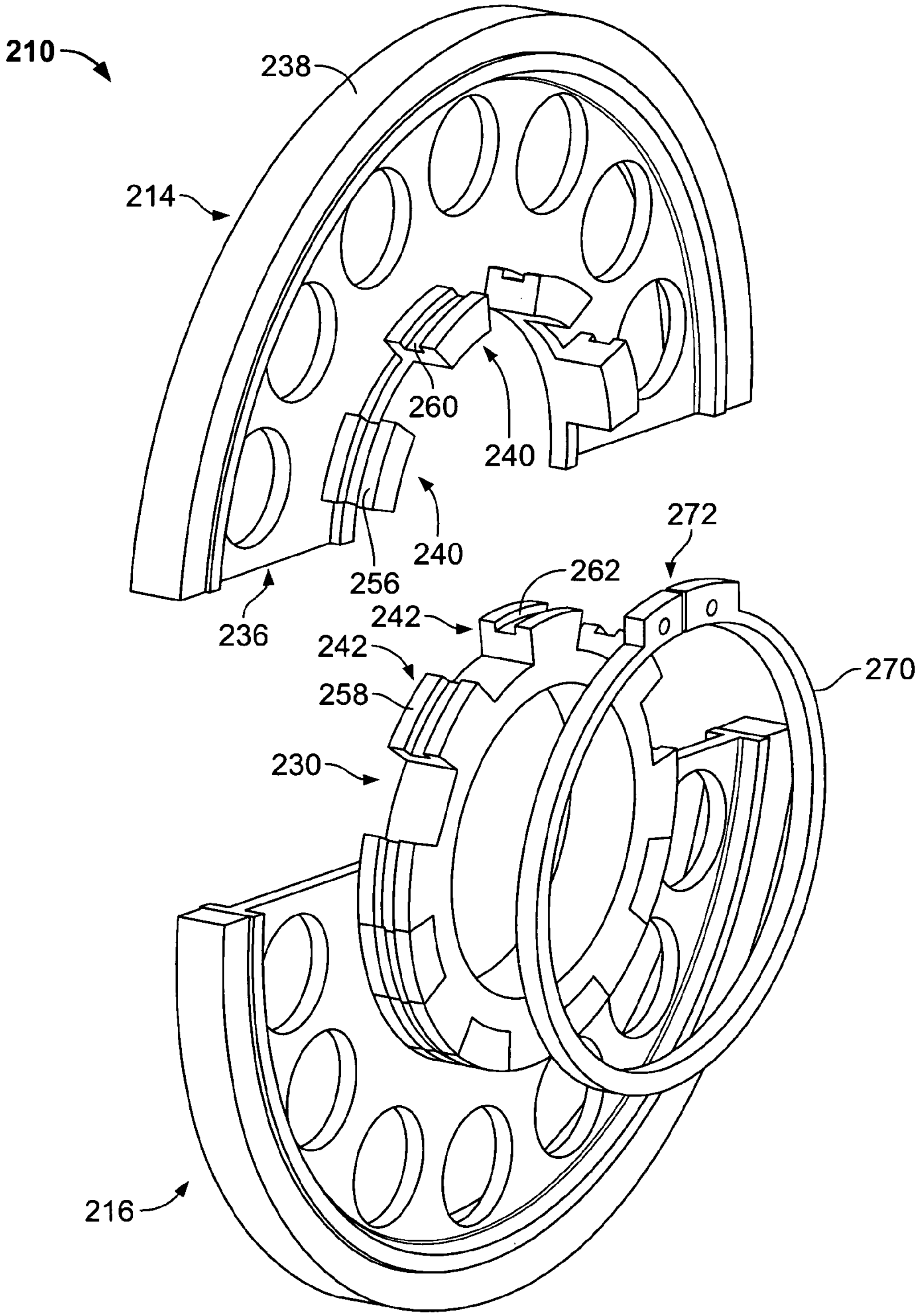
FIG. 6 shows a perspective view of a nip disk according to a third embodiment of the present invention.

FIG. 6 shows a perspective view of a nip disk 210 according to another embodiment of the present invention. Nip disk 210 includes an alignment ring 230 that is mounted on an outer circumference of a shaft (not shown), along with one or more other nip disks, for use as a nip roller, which may be used with another nip roller to guide signatures or a web in a printing press. Nip disk 210 includes two semi-annular disk halves 214, 216. Each disk half 214, 216 includes a plurality of radial alignment sections 240 axially protruding from the respective disk half 214, 216. Radial alignment sections 240 are spaced from one another at the inner circumference of disk halves 214, 216. Alignment ring 230 includes radial alignment sections 242 that protrude radially outward from alignment ring 230. Radial alignment sections 242 are spaced about an outer circumference of alignment ring 230. Spaces between alignment sections 242 are sized such that the spaces correspond with the shape of alignment sections 240 and spaces between alignment sections 240 are sized such that the spaces correspond with the shape of alignment sections 242. As a result, alignment sections 240 may be inserted snugly in the spaces between alignment sections 242 on alignment ring 230 such that disk halves 214, 216 cannot be separately rotated circumferentially with respect to alignment ring 230, i.e., as alignment ring 230 rotates circumferentially due to the movement of the shaft, disk halves 214, 216 also rotate together.

Radially exterior surfaces 256 of alignment sections 240 and radially exterior surfaces 258 of alignment sections 242 align circumferentially when alignment sections 240 are inserted in spaces of alignment ring 230. In a preferred embodiment, each alignment section 240, 242 includes a groove 260, 262, respectively, on an outer circumferential surface thereof. When disk halves 214, 216 are positioned on alignment ring 230, grooves 260, 262 align with one another and form a receiving ring. A retaining ring 270 may then be positioned in grooves 260, 262 of the formed receiving ring. Retaining ring 270 may be discontinuous and may include an interrupted portion 272 that defines a gap that allows ring 270 to be expanded and placed into grooves 260, 262. Fasteners may be provided at interrupted portion 272 to eliminate the gap and fix retaining ring 270 in grooves 260, 262, securing disk halves 214, 216 on alignment ring 230. In order to repair or replace disk halves 214, 216, the fasteners on retaining ring 270 may be loosened and retaining ring 270 may be removed from grooves 260, 262. Alignment sections 240 may then be slid axially out of spaces in alignment ring 230 to remove disk halves 214, 216 from alignment ring 230.

The embodiments of the present invention may advantageously allow for nip disks to be quickly removable due to the two piece designs of the nip disks. In alternative embodiments, each nip disk may include three or more separate portions that may be mounted on a shaft to form the nip disk. Shafts on the nip rollers do not have to be removed from corresponding bearings to remove the nip disks and any disk may be replaced without removal of other disks on the same shaft. Additionally, the embodiments do not rely on the strengths of fasteners to resist radial forces. By moving the fastening method close to the center of the shaft, a great reduction in inertia may be realized.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A nip roller comprising:

a shaft;

a first nip disk portion being a semi-annular disk;

a second nip disk portion being a semi-annular disk; and an attachment section for removably securing the first nip disk portion and the second nip disk portion to the shaft, the attachment section including a first semi-annular attachment part configured to removably attach the first nip disk portion to the shaft and a second semi-annular attachment part configured to removably attach the second nip disk portion to the shaft, the first semi-annular attachment part including a first mandrel, a first keeper and at least one first fastener and the second semi-annular attachment part including a second mandrel, a second keeper and at least one second fastener;

the at least one first fastener arranged and configured to force the first mandrel and the first keeper together so that first mandrel and first keeper grip the first nip disk portion; and the at least one second fastener arranged and configured to force the second mandrel and the second keeper together so that second mandrel and second keeper grip the second nip disk portion.

2. The nip roller recited in claim 1 wherein at least a portion of the attachment section is fixed to the shaft.

3. The nip roller recited in claim 1 wherein the attachment section is configured to grip an inner circumference of the first nip disk portion and an inner circumference of the second nip disk portion.

4. The nip roller recited in claim 1 wherein the attachment section is a ring having an inner circumference that corresponds to an outer circumference of the shaft.

5. The nip roller recited in claim 1 wherein the attachment section includes a first portion fixed to the shaft, a second portion axially movable with respect to the shaft and a fastener arranged and configured to force the second portion towards the first portion so that the first and second portions grip the first disk portion and the second disk portion.

6. A nip roller comprising:

a shaft;

a first nip disk portion;

a second nip disk portion; and an attachment section for removably securing the first nip disk portion and the second nip disk portion to the shaft, the attachment section including at least one mandrel, at least one keeper and at least one fastener, the at least one fastener being adapted to force the at least one keeper and the at least one mandrel together so the at least one keeper and at least one mandrel grip the first nip disk portion and the second nip disk portion.

7. The nip roller recited in claim 6 wherein the first nip disk portion includes a first radial alignment section, the second nip disk portion includes a second radial alignment section and the at least one mandrel includes a first groove shaped to receive the first radial alignment section and a second groove shaped to receive the second radial alignment section.

8. The nip roller recited in claim 6 wherein the attachment section is arranged and configured such that the at least one fastener maintains contact with the at least one keeper and the at least one mandrel when the first nip disk portion and the second nip disk portion are detached from the shaft.

9. The nip roller recited in claim 6 wherein at least a portion of the attachment section is fixed to the shaft.

10. The nip roller recited in claim 6 wherein the attachment section is configured to grip an inner circumference of the first nip disk portion and an inner circumference of the second nip disk portion.

11. The nip roller recited in claim 6 wherein the attachment section is a ring having an inner circumference that corresponds to an outer circumference of the shaft.

12. The nip roller recited in claim 6 wherein the first nip disk portion and the second nip disk portion are semi-annular disks.

* * * * *